(12) United States Patent
Cheng et al.

(10) Patent No.: US 10,643,543 B2
(45) Date of Patent: May 5, 2020

(54) MULTI-SENSING CHANNELS DESIGN FOR PIXEL COMPENSATION

(71) Applicant: Novatek Microelectronics Corp., Hsinchu (TW)

(72) Inventors: Jhih-Siou Cheng, New Taipei (TW); Tzong-Honge Shieh, Hsinchu County (TW); Ju-Lin Huang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/120,332

(22) Filed: Sep. 3, 2018

(65) Prior Publication Data

US 2019/0156736 A1 May 23, 2019

Related U.S. Application Data

(60) Provisional application No. 62/590,347, filed on Nov. 23, 2017.

(51) Int. Cl.
| | |
|---|---|
| *G09G 3/3258* | (2016.01) |
| *G06F 3/041* | (2006.01) |
| *G06F 3/044* | (2006.01) |
| *G09G 3/3275* | (2016.01) |
| *G09G 3/3208* | (2016.01) |

(52) U.S. Cl.
CPC ........... *G09G 3/3258* (2013.01); *G06F 3/044* (2013.01); *G06F 3/0412* (2013.01); *G09G 3/3208* (2013.01); *G09G 3/3275* (2013.01); *G09G 2300/0426* (2013.01); *G09G 2300/0819* (2013.01); *G09G 2300/0828* (2013.01); *G09G 2310/027* (2013.01); *G09G 2310/0297* (2013.01); *G09G 2310/08* (2013.01); *G09G 2320/0233* (2013.01); *G09G 2320/0295* (2013.01); *G09G 2320/045* (2013.01); *G09G 2330/12* (2013.01)

(58) Field of Classification Search
CPC .. G09G 3/3258; G09G 3/3208; G09G 3/3275; G09G 2310/0297; G09G 2320/0295; G09G 2320/045; G09G 2300/0819; G09G 2330/12; G09G 2310/08; G09G 2320/0233; G09G 2300/0426; G09G 2310/027; G09G 2300/0828; G06F 3/044; G06F 3/0412

See application file for complete search history.

(56) References Cited

U.S. PATENT DOCUMENTS

| | | | |
|---|---|---|---|
| 2015/0116263 A1* | 4/2015 | Kim | ........................ G06F 3/044 345/174 |
| 2018/0174522 A1* | 6/2018 | Lee | ........................ G09G 3/3258 |

\* cited by examiner

*Primary Examiner* — Muhammad N Edun
(74) *Attorney, Agent, or Firm* — JCIPRNET

(57) ABSTRACT

A driver of a display panel is provided. The driver includes a plurality of sensing channels configured to receive a plurality of sensing signals from the display panel via a plurality of sensing lines and output the sensing signals, the sensing channels are coupled to the sensing lines in an arrangement selected from one of a random arrangement and a normal arrangement. The driver further includes a signal convertor coupled to the sensing channels and configured to receive the sensing signals from the sensing channels in a sequence selected from one of a random sequence and a normal sequence.

20 Claims, 14 Drawing Sheets

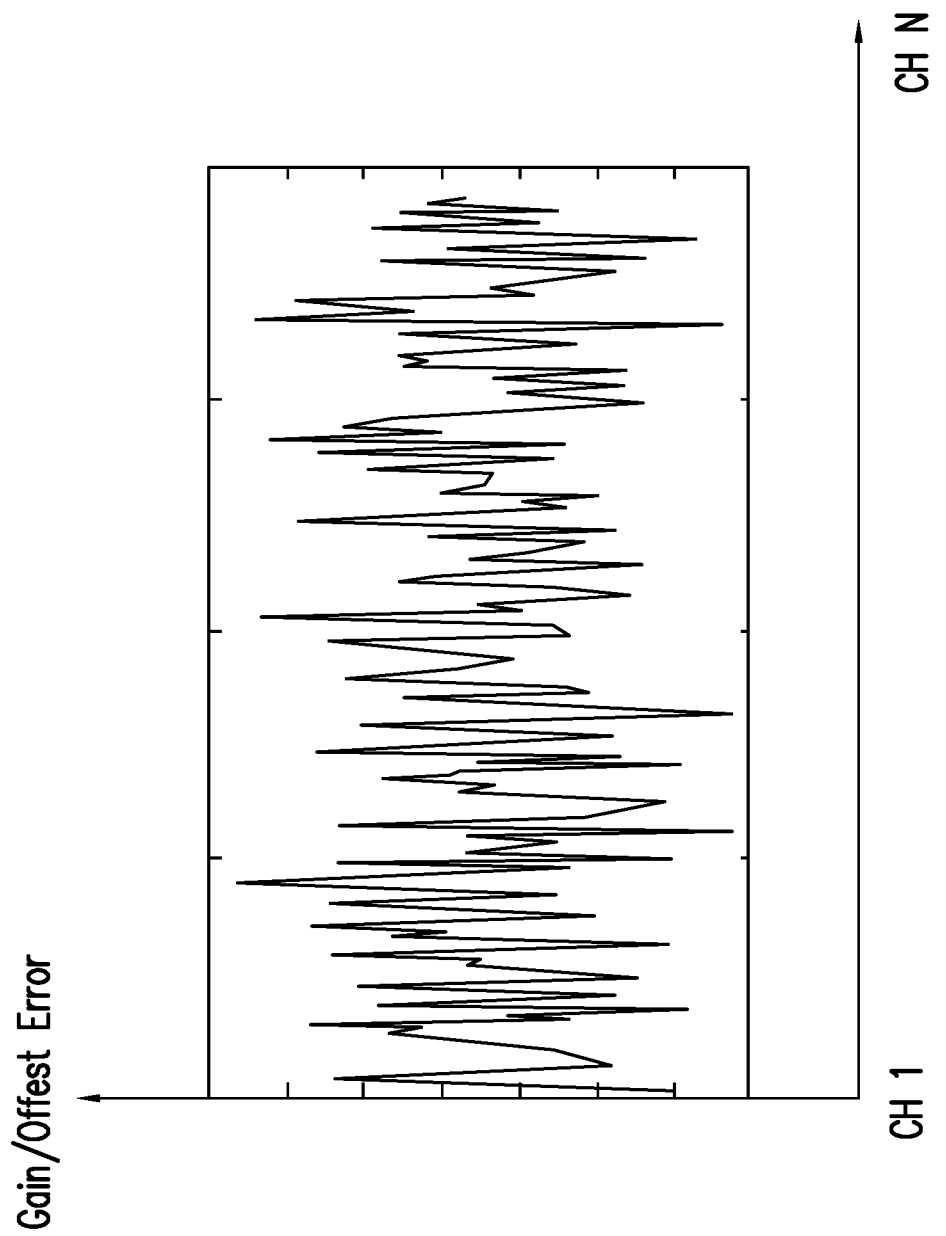

US 10,643,543 B2

MULTI-SENSING CHANNELS DESIGN FOR PIXEL COMPENSATION

CROSS-REFERENCE TO RELATED APPLICATION

This application claims the priority benefit of U.S. provisional application Ser. No. 62/590,347, filed on Nov. 23, 2017. The entirety of the above-mentioned patent application is hereby incorporated by reference herein and made a part of this specification.

BACKGROUND

Technical Field

The invention relates to a multi-sensing channel design, and particularly, a multi-sensing channels design for pixel compensation.

Description of Related Art

In compensation, the I-V characteristic of the thin-film transistor (TFT) in pixel or organic light-emitting diode (OLED) is sensed and transmitted to the sensing channels of the driver. The driver transmits the sensed data to a system on chip (SOC) so as to calculate the driven voltage value necessary for compensation to transmit to the driver for actual compensating. In the compensation pixel circuit, other than the conventional data line, a sensing line can sense the I-V characteristic of the TFT or OLED and transmits to the driver. After the sensing signals are read, the SOC can perform more complex algorithm in the compensation method, so as to compensate the threshold voltage (Vth) degradation of the TFT, non-uniformity of mobility, and OLED aging, etc. The technical difficulty of compensation is how to achieve high resolution and high precision of the I-V characteristic of the TFT and OLED.

In order to prevent the aperture ratio from being affected when there are too many sensing lines, a plurality of pixels usually share one sensing line. In addition, when designing the driver integrated circuit (IC), in order to avoid high cost and high power consumption due to using many signal convertor, a plurality of sensing channels are designed to share one signal convertor. The sensing signals are sequentially transmitted from the sensing lines to the sensing channels, respectively. However, when sequentially transmitting the sensing signals to the signal convertor, the hold time of the electrical charge in each of the sensing channels is different from each other. Therefore, the gain error and the offset error of each of the sensing channels are different from each other, which causes the abnormal display.

SUMMARY

To make the aforementioned more comprehensible, several embodiments accompanied with drawings are described in detail as follows.

The invention is directed to a multi-sensing channels design for pixel compensation, which can improve the poor uniformity of the display panel.

The invention provides a driver of a display panel, the driver includes a plurality of sensing channels configured to receive a plurality of sensing signals from the display panel via a plurality of sensing lines and output the sensing signals, the sensing channels are coupled to the sensing lines in an arrangement selected from one of a random arrangement and a normal arrangement. The driver includes a signal convertor coupled to the sensing channels and configured to receive the sensing signals from the sensing channels in a sequence selected from one of a random sequence and a normal sequence.

In one embodiment of the invention, the sensing channels are coupled to the sensing lines in the random arrangement, and the signal convertor receives the sensing signals from the sensing channels in the normal sequence.

In one embodiment of the invention, the driver further includes a plurality of input pads, corresponding to the sensing lines and a plurality of first switch elements coupled between the input pads and the sensing channels, the first switch elements are coupled to the sensing channels according to the random arrangement.

In one embodiment of the invention, the first switch elements are controlled by a first control signal, and the first switch elements are conducted by the first control signal at the same time when the sensing channels receive the sensing signals from the display panel.

In one embodiment of the invention, the driver further includes a plurality of second switch elements coupled between the sensing channels and the signal convertor.

In one embodiment of the invention, the second switch elements are controlled by a plurality of second control signals, and the second switch elements are conducted according to the normal sequence by the second control signals when the sensing channels outputs the sensing signals to the signal convertor.

In one embodiment of the invention, the sensing channels are coupled to the sensing lines in the normal arrangement, and the signal convertor receives the sensing signals from the sensing channels in the random sequence.

In one embodiment of the invention, the driver further includes a plurality of input pads, corresponding to the sensing lines and a plurality of first switch elements coupled between the input pads and the sensing channels, and the first switch elements are coupled to the sensing channels according to the normal arrangement.

In one embodiment of the invention, the first switch elements are controlled by a first control signal, and the first switch elements are conducted by the first control signal at the same time when the sensing channels receive the sensing signals from the display panel.

In one embodiment of the invention, the driver further includes a plurality of second switch elements coupled between the sensing channels and the signal convertor.

In one embodiment of the invention, the second switch elements are controlled by a plurality of second control signals, and the second switch elements are conducted according to the random sequence by the second control signals when the sensing channels outputs the sensing signals to the signal convertor.

In one embodiment of the invention, the sensing channels are coupled to the sensing lines in the normal arrangement, and the signal convertor receives the sensing signals from the sensing channels in the normal sequence, each of the sensing channels has a hold time for the respective sensing signal, and the hold times of the sensing channels substantially have the same time length.

In one embodiment of the invention, the driver further includes a plurality of input pads corresponding to the sensing lines, a plurality of first switch elements coupled between the input pads and the sensing channels according to the normal arrangement, and a plurality of second switch elements coupled between the sensing channels and the signal convertor.

In one embodiment of the invention, the first switch elements are conducted by a plurality of first control signals when the sensing channels receive the sensing signals from the display panel.

In one embodiment of the invention, the second switch elements are controlled by a plurality of second control signals, and the second switch elements are conducted according to the normal sequence by the second control signals when the sensing channels output the sensing signals to the signal convertor.

In one embodiment of the invention, for each of the sensing channel, the first control signal comprises an active pulse ending at a first edge and the second control signal comprises an active pulse starting at a second edge, and the hold time of the sensing channel for the sensing signal starts at the first edge of the first control signal and ends at the second edge of the second control signal.

The invention provides a driver of a display panel, the driver includes a plurality of sensing channels configured to receive a plurality of sensing signals from the display panel via a plurality of sensing lines and output the sensing signals, and a signal convertor coupled to the sensing channels and configured to receive the sensing signals from the sensing channels. Each of the sensing channels has a hold time for the respective sensing signal, and the hold times of the sensing channels substantially have the same time length.

In one embodiment of the invention, the driver further includes a plurality of input pads corresponding to the sensing lines, a plurality of first switch elements coupled between the input pads and the sensing channels according to a normal arrangement, and a plurality of second switch elements coupled between the sensing channels and the signal convertor.

In one embodiment of the invention, the first switch elements are conducted by a plurality of first control signals when the sensing channels receive the sensing signals from the display panel.

In one embodiment of the invention, the second switch elements are controlled by a plurality of second control signals, and the second switch elements are conducted according to a normal sequence by the second control signals when the sensing channels outputs the sensing signals to the signal convertor.

In one embodiment of the invention, for each of the sensing channel, the first control signal comprises an active pulse ending at a first edge and the second control signal comprises an active pulse starting at a second edge, and the hold time of the sensing channel for the sensing signal starts at the first edge of the first control signal and ends at the second edge of the second control signal.

Based on the above, in the invention, by the randomly outputting the sensing signals to the signal convertor, the compensating values having greater and smaller values due to gain error and offset error are randomly used to the pixels on the display panel, so as to improve the uniformity of the display panel. In addition, each of the hold times of the sensing channels is averaged and the hold times of the sensing signals are consistent with each other so that the performance of each of the sensing channels is similar to each other. As a result, the compensating value is accurately calculated so as to reduce or even eliminate the poor uniformity of the display panel.

The abovementioned features and advantages of the invention will become more obvious and better understood with regard to the following description of the exemplary embodiments and accompanying drawings in the below.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2C is a graph depicting the relationship between the sensing channels and the gain error or offset error.

DESCRIPTION OF THE EMBODIMENTS

Figure 1A:
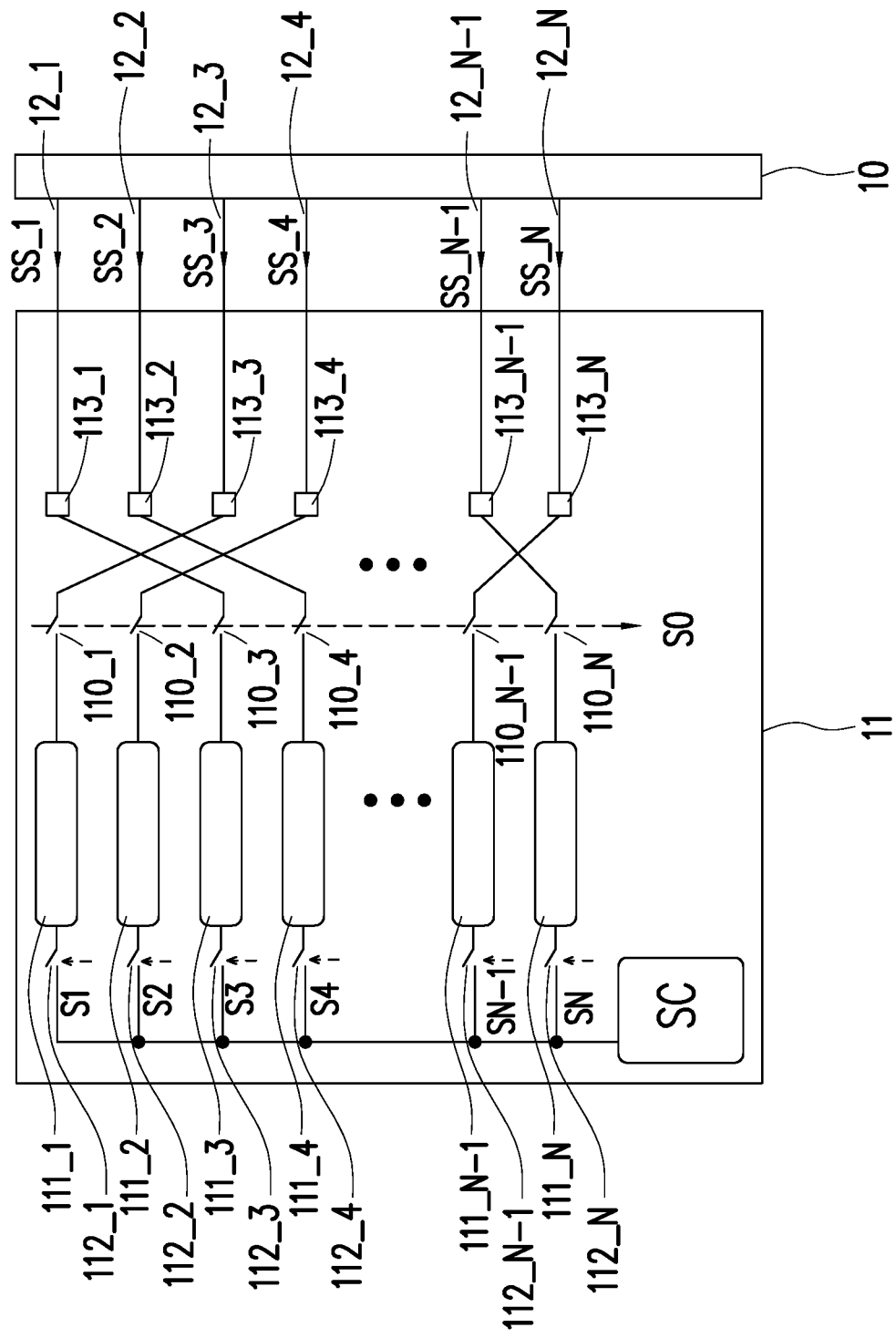
FIG. 1A is a schematic view illustrating circuit in a driver according to the first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic view illustrating circuit in a driver according to the first embodiment of the invention. As shown in FIG. 1A, a driver 11 and a display panel 10 are coupled to each other through a plurality of sensing lines 12_1 to 12_N. It should be noted here, N is an integer equal to or greater than 1. To be more specific, the driver 11 includes a plurality of sensing channels 111_1 to 111_N. The sensing channels 111_1 to 111_N are configured to receive a plurality of sensing signals SS_1 to SS_N from the display panel 10 via the sensing lines 12_1 to 12_N and to output the sensing signals SS_1 to SS_N. The sensing channels 111_1 to 111_N are coupled to the sensing lines 12_1 to 12_N in a random arrangement. In addition, the driver 11 further includes a signal convertor SC (such as an analog-to-digital converter) coupled to the sensing channels 111_1 to 111_N. The driver 11 is configured to receive the sensing signals SS_1 to SS_N from the sensing channels 111_1 to 111_N in a normal sequence. It should be further noted here, in the present embodiment, the sensing lines 12_1 to 12_N are sequentially arranged from one side (left side) to an opposite side (right side) of the display panel 10. The sensing signals SS_1 to SS_N are outputted from the display panel 10 to the sensing lines 12_1 to 12_N, respectively. Further, in other embodiments, the sensing channels may be coupled to the sensing lines in an arrangement selected from one of a random arrangement and a normal arrangement, and the signal convertor may be coupled to the sensing channels and configured to receive the sensing signals from the sensing channels in a sequence selected from one of a random sequence and a normal sequence, the invention is not limited thereto. The random arrangement, the normal arrangement, the random sequence and the normal sequence are further explained hereinafter.

The driver 11 further includes a plurality of input pads 113_1 to 113_N corresponding to the sensing lines 12_1 to 12_N. The driver 11 further includes a plurality of first switch elements 110_1 to 110_N coupled between the input pads 113_1 to 113_N and the sensing channels 111_1 to 111_N. The first switch elements 110_1 to 110_N are coupled to the sensing channels 111_1 to 111_N according to the random arrangement. That is to say, in the present embodiment, the sensing lines 12_1 to 12_N and the sensing channels 111_1 to 111_N are randomly coupled to each other through the input pads 113_1 to 113_N and the first switch elements 110_1 to 110_N.

The driver 11 further includes a plurality of second switch elements 112_1 to 112_N coupled between the sensing channels 111_1 to 111_N and the signal convertor SC. That is to say, in the present embodiment, the sensing channels 111_1 to 111_N are coupled to the signal convertor SC through the second switch elements 112_1 to 112_N.

The first switch elements 110_1 to 110_N are controlled by a first control signal S0. The first switch elements 110_1 to 110_N are conducted by the first control signal S0 at the same time when the sensing channels 111_1 to 111_N receives the sensing signals from the display panel 10. In other words, the first control signal S0 controls the first switch elements 110_1 to 110_N to turn on at the same time so as to receive the sensing signals SS_1 to SS_N from the display panel 10.

The second switch elements 112_1 to 112_N are controlled by a plurality of second control signals S1 to SN, respectively. The second switch elements 112_1 to 112_N are conducted according to the normal sequence by the second control signals S1 to SN when the sensing channels 111_1 to 111_N outputs the sensing signals SS_1 to SS_N to the signal convertor SC. In other words, the second control signal S1 to the second control signal SN respectively control the second switch element 112_1 to the second switch element 112_N to turn on (conduct) one after another so as to output the sensing signals SS_1 to SS_N to the signal convertor SC. The sensing signals SS_1 to SS_N are randomly stored in the sensing channels 111_1 to 111_N.

The control signals, such as the first control signal S0 and the second control signals S1 to SN, are provided from one or more controllers (not shown). These controllers are disposed inside the driver 11 or outside the driver 11, but the invention is not limited thereto.

The random arrangement and the normal sequence in the present embodiment are further explained as follows. Again, in the present embodiment, the sensing channels 111_1 to 111_N are coupled to the sensing lines 12_1 to 12_N in the random arrangement through the input pads 113_1 to 113_N and the first switch elements 110_1 to 110_N. The signal convertor SC receives the sensing signals from the sensing channels 111_1 to 111_N in the normal sequence through the second switch elements 112_1 to 112_N. For example, the sensing channels 111_1 to 111_N are randomly coupled to the sensing lines 12_1 to 12_N. Hence, the sensing channel 111_1 may not be coupled to the sensing line 12_1, the sensing channel 111_2 may not be coupled to the sensing line 12_2, and so on, up to the sensing channel 111_N may not be coupled to the sensing line 12_N. As shown in FIG. 1A, for example, the sensing channel 111_1 may be coupled to the sensing line 12_3, the sensing channel 111_2 may be coupled to the sensing line 12_4, the sensing channel 111_3 may be coupled to the sensing line 12_1, and the sensing channel 111_4 may be coupled to the sensing line 12_2. Further, the sensing channel 111_N−1 may be coupled to the sensing line 12_N, and the sensing channel 111_N may be coupled to the sensing line 12_N−1. Additionally, the signal convertor SC receives the sensing signals sequentially from the sensing channel 111_1 to the sensing channel 111_N. Therefore, the signal convertor SC may receive the sensing signal from the sensing channel 111_1, the sensing signal from the sensing channel 111_2, and so on, up to the sensing signal from the sensing channel 111_N one after another.

Herein, the signal convertor SC receives the sensing signals sequentially from the sensing channel 111_1 to the sensing channel 111_N. However, the sensing channels 111_1 to 111_N are coupled to the sensing lines 12_1 to 12_N in the random arrangement. Therefore, the sensing signals SS_1 to SS_N are respectively stored into the sensing channels 111_1 to 111_N in a random order when the first switch elements 110_1 to 110_N conduct at the same time. Thus, the sensing signals SS_1 to SS_N are not sequentially, in an order from the sensing signal SS_1 to the sensing signal SS_N, received by the signal convertor SC. For example, as shown in FIG. 1A, the signal convertor SC receives the sensing signal SS_3 stored in the sensing channel 111_1 first. The signal convertor SC then receives the sensing signal SS_4 stored in the sensing channel 111_2, the sensing signal SS_1 stored in the sensing channel 111_3, the sensing signal SS_2 stored in the sensing channel 111_4, and so on. Finally, the signal convertor SC receives the sensing signal SS_N stored in the sensing channel 111_N−1 and the sensing signal SS_N−1 stored in the sensing channel 111_N one after another.

That is to say, in the driver 11 shown in FIG. 1A of the present embodiment, the first control signal S0 controls the first switch elements 110_1 to 110_N to conduct at the same time. Hence, the sensing signals SS_1 to SS_N are randomly stored in the sensing channels 111_1 to 111_N at the same time. The second switch elements 112_1 to 112_N sequentially conduct (turn on), in an order from the second switch element 112_1 to the second switch element 112_N, to output the sensing signals SS_1 to SS_N to the signal convertor SC. Thus, the sensing signals SS_1 to SS_N are randomly outputted to the signal convertor SC. In particular, since the sensing lines 12_1 to 12_N are randomly coupled to the sensing channels 111_1 to 111_N, the sensing signal SS_1 of the sensing line 12_1 is not the first sensing signal outputted to the signal convertor SC and does not have the shortest hold time. Similarly, the sensing signal SS_2 of the sensing line 12_2 is not the second sensing signal outputted to the signal convertor SC. The sensing signal SS_N of the sensing line 12_N is not the final sensing signal outputted to the signal convertor SC and has the longest hold time. As a result, the effect of randomly outputting the sensing signals SS_1 to SS_N to the signal convertor SC can be achieved.

Figure 1B:
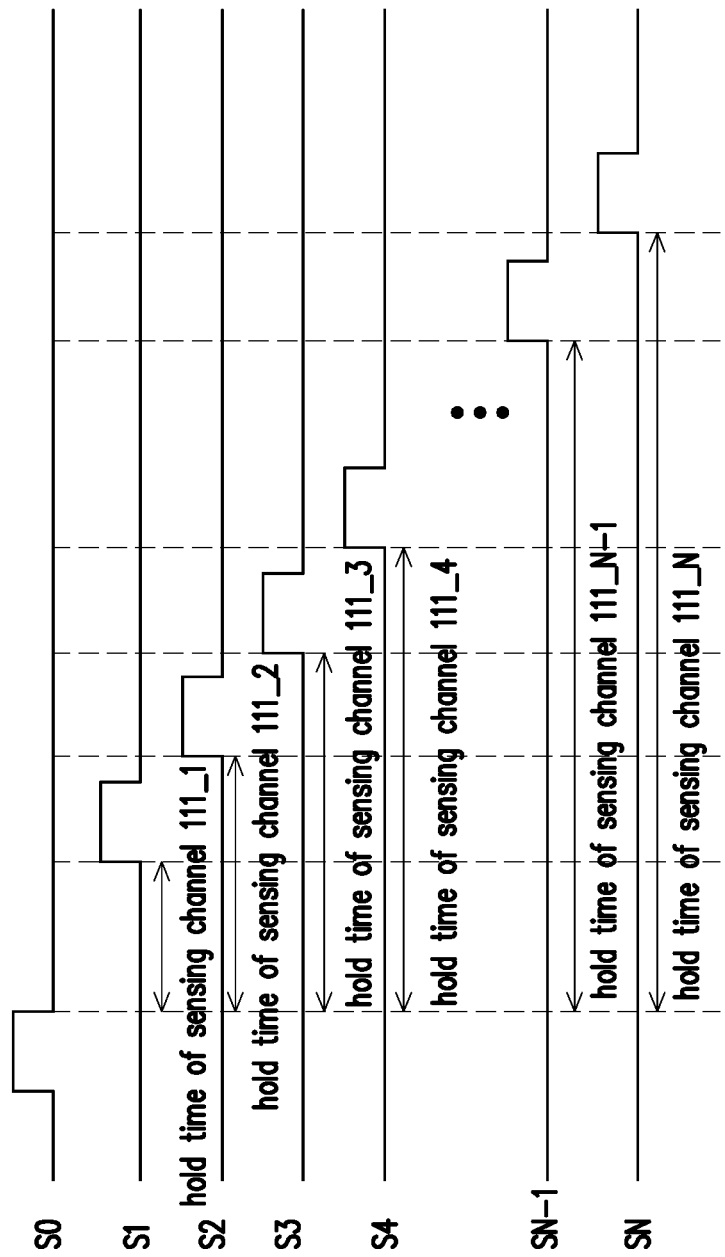
FIG. 1B is a graph illustrating hold times of sensing channels of the embodiment in FIG. 1A.

FIG. 1B is a graph illustrating hold times of sensing channels of the embodiment in FIG. 1A. The hold time of one sensing channel is the time between the time that the first control signal S0 is off and the time that the second control signal of that sensing channel is on. In other words, the hold time is the time that the sensing signal is held in the sensing channel. As shown in FIGS. 1A and 1B, for example, the sensing signal having the shortest hold time is the sensing signal SS_3 (instead of the sensing signal SS_1) stored in the sensing channel 111_1. In addition, the sensing signal having the longest hold time is the sensing signal SS_N−1 (instead of the sensing signal SS_N) stored in the sensing channel 111_N. The invention is not limited thereto.

Accordingly, by randomly outputting the sensing signals SS_1 to SS_N to the signal convertor SC, the sensing signal SS_1 does not have the shortest hold time and thus does not have the lowest attenuation level, and the sensing signal SS_N does not have the longest hold time and thus does not have the greatest attenuation level. That is to say, the sensing signals SS_1 to SS_N do not have the attenuation level gradually increase from the sensing signal SS_1 to the sensing signal SS_N. Instead, the sensing signals SS_1 to SS_N have random attenuation levels. The system, such as timing controller or television controller chip having time controlling function, provides different compensating values for the display data according to the sensing signals SS_1 to SS_N outputted to the signal convertor SC. If a sensing signal has a lower attenuation level due to shorter hold time, the compensating value according to that sensing signal is smaller. If a sensing signal has a greater attenuation level due to longer hold time, the compensating value according to that sensing signal is greater. As a result, the greater compensating values are randomly distributed on the display panel 10, and similarly, the smaller compensating values are randomly distributed on the display panel 10. The compensating value may be a voltage value, the invention is not limited thereto.

Figure 1C:
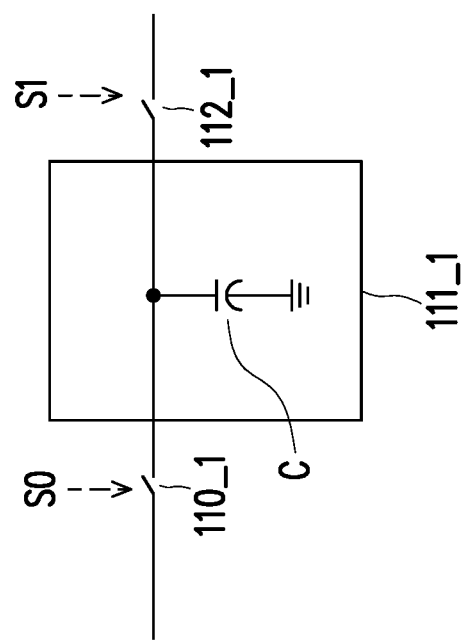
FIG. 1C is a schematic view illustrating one of the sensing channels of the embodiment in FIG. 1A.

FIG. 1C is a schematic view illustrating one of the sensing channels of the embodiment in FIG. 1A. To be more specific, the sensing channel 111_1 is shown in FIG. 1C as an example. The sensing channel 111_1 is connected to the first switch element 110_1 controlled by the first control signal S0. The sensing channel 111_1 is connected to the second switch elements 112_1 controlled by the second control signal S1. Additionally, the sensing channel 111_1 includes a capacitor C which is used to store one of the sensing signals SS_1 to SS_N. However, the invention is not limited thereto, the sensing channel may include more than one capacitor or may include a capacitor array. The other sensing channels are the same as or similar to the sensing channel 111_1 as shown in FIG. 1C.

Although the compensating value for display data of each pixel is different from each other, human eye cannot distinguish the brightness difference between two adjacent pixels and normally perceive the brightness of a region of the display panel as a whole. Therefore, for human eye, strip-shaped blocks with clear boundary showing brightness difference do not appear on the display panel 10, so as to improve the uniformity of the display panel 10.

Figure 2A:
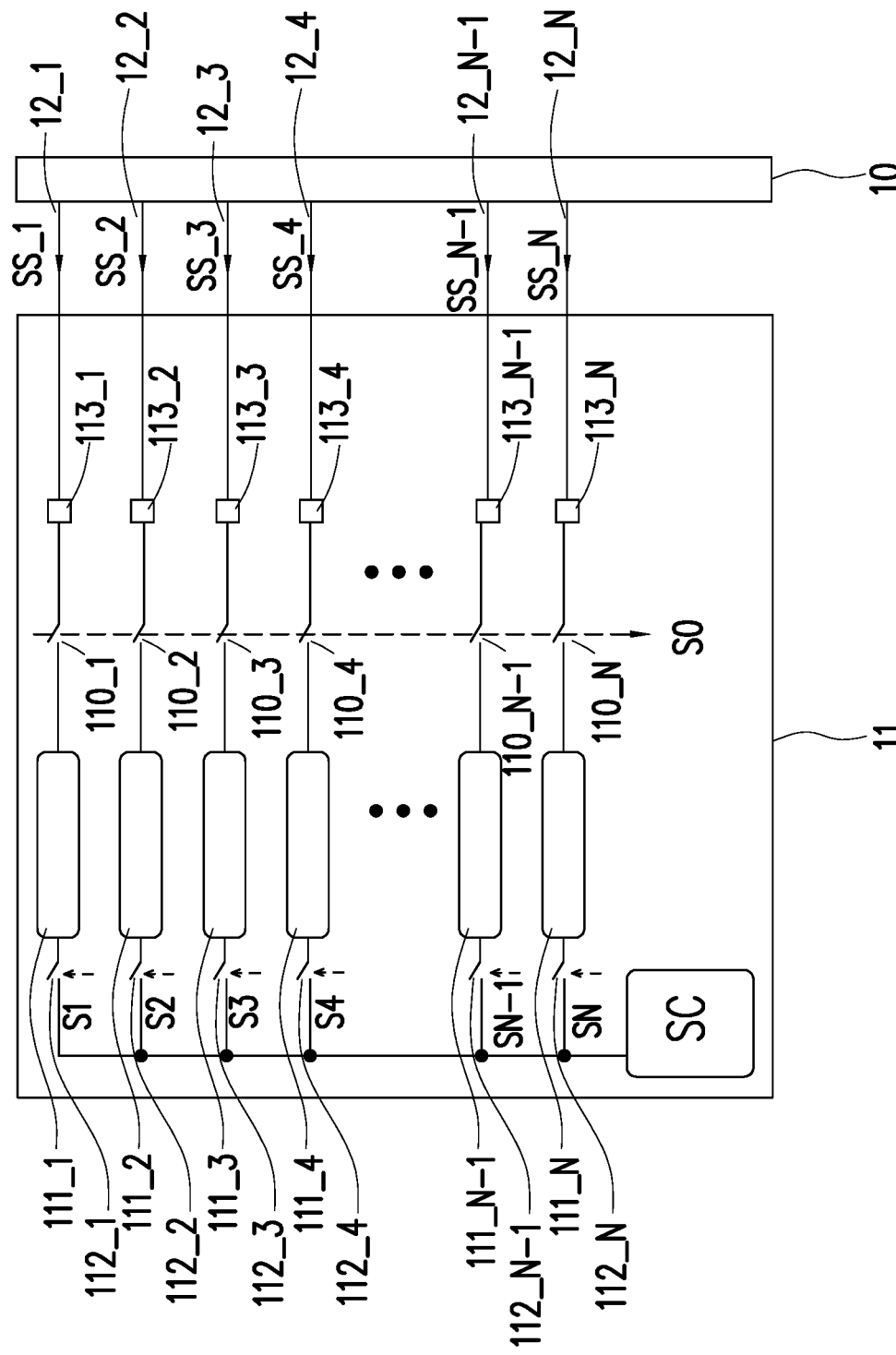
FIG. 2A is a schematic view illustrating circuit in a driver according to the second embodiment of the invention.
Figure 2B:
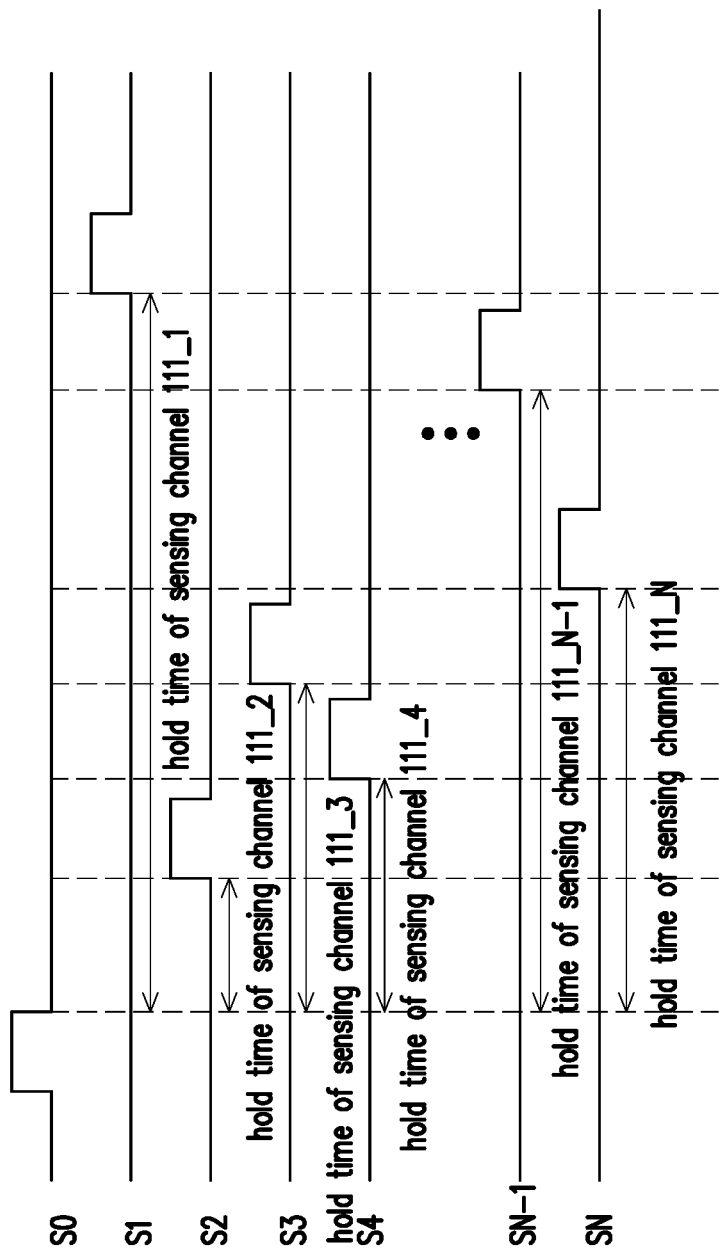
FIG. 2B is a graph illustrating hold times of sensing channels of the embodiment in FIG. 2A.

FIG. 2A is a schematic view illustrating circuit in a driver according to the second embodiment of the invention. FIG. 2B is a graph illustrating hold times of sensing channels of the embodiment in FIG. 2A. FIG. 2C is a graph depicting the relationship between the sensing channels and the gain error or offset error in the second embodiment. Compared to the previous embodiment, the same reference numbers indicate the same or similar elements in the present embodiment, only the differences between the two embodiments are described hereinafter.

In the present embodiment, the sensing channels 111_1 to 111_N are coupled to the sensing lines 12_1 to 12_N in the normal arrangement. The signal convertor SC receives the sensing signals SS_1 to SS_N from the sensing channels 111_1 to 111_N in the random sequence. As an example shown in FIG. 2A, in the present embodiment, the sensing channel 111_1 is coupled to the sensing line 12_1, the sensing channel 111_2 is coupled to the sensing line 12_2, and so on. Finally, the sensing channel 111_N is coupled to the sensing line 12_N. In addition, the signal convertor SC does not receive the sensing signal SS_1 from the sensing channel 111_1 to the sensing signal SS_N from the sensing channel 111_N one after another. The sensing signals SS_1 to SS_N from the sensing channels 111_1 to 111_N are randomly received by the signal convertor SC.

To be more specific, the first switch elements 110_1 to 110_N are coupled to the sensing channels 111_1 to 111_N according to the normal arrangement. That is to say, the sensing channels 111_1 to 111_N are coupled to the sensing lines 12_1 to 12_N through the first switch elements 110_1 to 110_N, respectively.

In addition, the second switch elements 112_1 to 112_N are conducted according to the random sequence by the second control signals S1 to SN when the sensing channels 111_1 to 111_N outputs the sensing signals to the signal convertor SC. That is to say, the second control signals S1 to SN control the second switch elements 112_1 to 112_N to turn on (conduct) randomly so as to randomly output the sensing signals SS_1 to SS_N to the signal convertor SC.

As an example shown in FIG. 2B, after storing the sensing signals SS_1 to SS_N in the sensing channels 111_1 to 111_N, the second control signal S2 controls the second switch element 112_2 to turn on (conduct) and output the sensing signals SS_2. Next, the second control signal S4 controls the second switch element 112_4 to turn on (conduct) and output the sensing signals SS_4, the second control signal S3 controls the second switch element 112_3 to turn on (conduct) and output the sensing signals SS_3, and so on. Finally, the second control signal SN−1 controls the second switch element 112_N−1 to turn on (conduct) and output the sensing signals SS_N−1, and the second control signal S1 controls the second switch element 112_1 to turn on (conduct) and output the sensing signal SS_1. The sensing period ends.

However, the invention is not limited thereto. In other embodiments, other sequence of outputting the sensing signals can be adopted. For example, there may be more than one sensing periods. In the first sensing period, the odd-numbered second switch elements (such as the second switch elements 112_1, 112_3, 112_5, etc.) are sequentially turned on, and then the even-numbered second switch elements (such as the second switch elements 112_2, 112_4, 112_6, etc.) are sequentially turned on. In the next sensing period, the sequence of turning on (conducting) the second switch elements is the same as or different from the first sensing period.

In the present embodiment, the performance of the sensing channel 111_1 is not the best, and the performance of the sensing channel 111_N is not the worst. The performance may be the gain error and the offset error of the sensing channel, the invention is not limited thereto. In other words, the gain error and the offset error of the sensing channel 111_1 is not lowest and the gain error and the offset error of the sensing channel 111_N is not highest, as shown in FIG. 2C.

Therefore, the effect of randomly outputting the sensing signals SS_1 to SS_N to the signal convertor SC is also achieved so as to improve the uniformity of the display panel 10 after compensation, as described above.

In the present embodiment, the driver 11 may further include a cache memory used to store a plurality of digital sensing signals which are outputted from the signal convertor SC corresponding to the sensing channel 111_1 to 111_N. When the sensing period is completed, the driver 11, again, sends the digital sensing signals to the system according to the sequence required by the system. In other words, the system can still receive the digital sensing signals that sequentially corresponding to the sensing channels 111_1 to 111_N. The system does not need to obtain information about which sequence the driver 11 process the sensing signals SS_1 to SS_N.

Figure 3A:
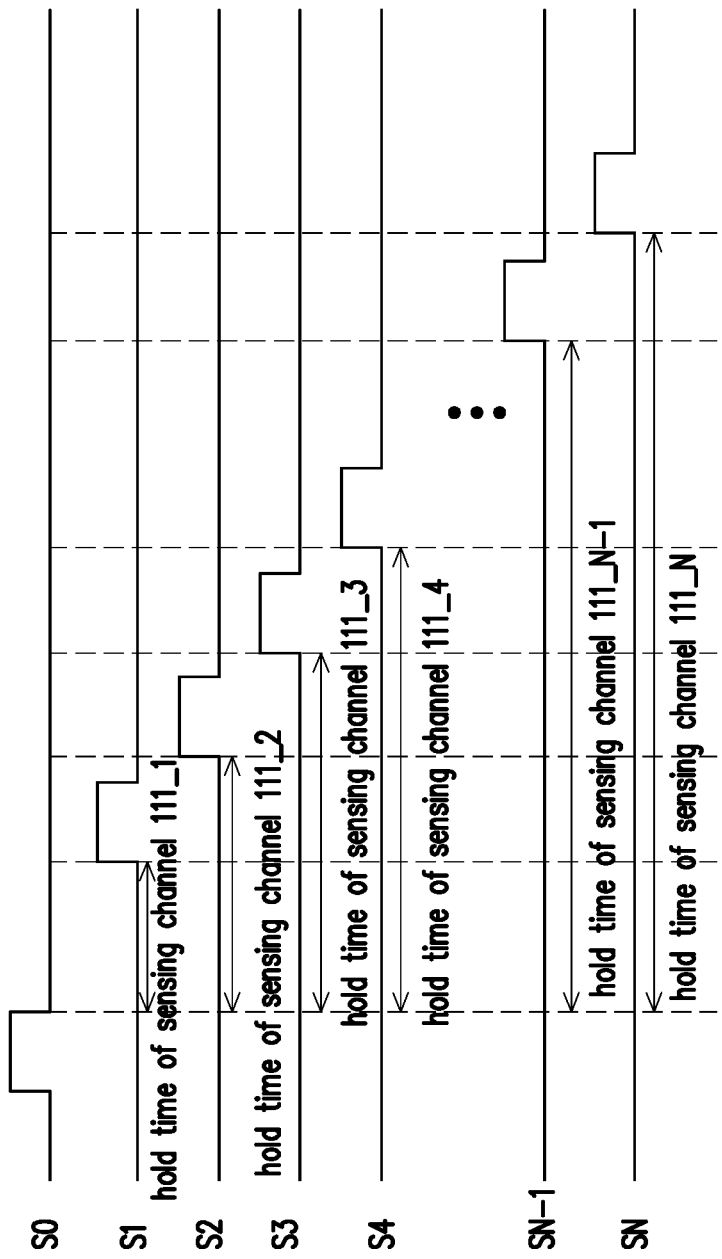
FIG. 3A is a graph illustrating a normal sequence of outputting sensing signals to the signal convertor according to the third embodiment of the invention.
Figure 3B:
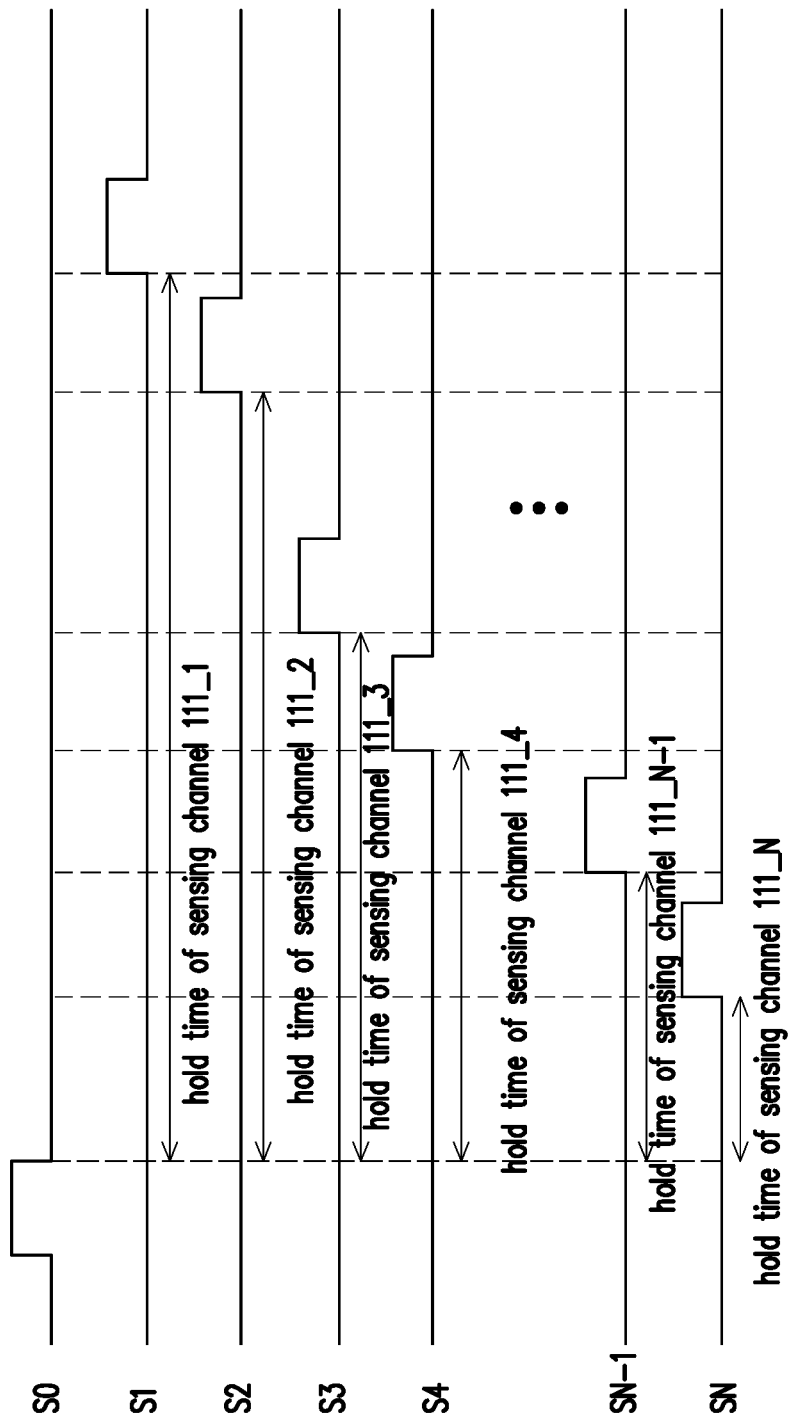
FIG. 3B is a graph illustrating a reverse sequence of outputting sensing signals to the signal convertor according to the third embodiment of the invention.

FIG. 3A is a graph illustrating a normal sequence of outputting sensing signals to the signal convertor according to the third embodiment of the invention. FIG. 3B is a graph illustrating a reverse sequence of outputting sensing signals to the signal convertor according to the third embodiment of the invention. Compared to the previous embodiments, the same reference numbers indicate the same or similar elements in the present embodiment, only the differences between the embodiments are described hereinafter.

In the third embodiment, the sensing channels 111_1 to 111_N are coupled to the sensing lines 12_1 to 12_N in the normal arrangement. However, the signal convertor SC receives the sensing signals SS_1 to SS_N from the sensing channels 111_1 to 111_N in different sequences during different sensing periods. That is to say, the signal convertor SC receives the sensing signals SS_1 to SS_N from the sensing channels 111_1 to 111_N in a first sequence during a first sensing period. The signal convertor SC receives the sensing signals SS_1 to SS_N from the sensing channels 111_1 to 111_N in a second sequence during a second sensing period. The first sequence and the second sequence are complementary. The first sequence is selected from one of a normal sequence and a reverse sequence, and the second sequence is selected from another one of the normal sequence and the reverse sequence.

In the third embodiment, the first sequence is a normal sequence and the second sequence is a reverse sequence, as an example, and the invention is not limited thereto.

Further, the second switch elements 112_1 to 112_N are controlled by a plurality of second control signals S1 to SN. The second switch elements 112_1 to 112_N are conducted according to the different sequences during the different sensing periods by the second control signals S1 to SN when the sensing channels 111_1 to 111_N outputs the sensing signals SS_1 to SS_N to the signal convertor SC.

To be more specific, as an example shown in FIG. 3A, in the first sensing period, the second switch elements 112_1 to 112_N are sequentially conducted (turned on), so as to sequentially output the sensing signals SS_1 to SS_N to the signal convertor SC. That is to say, in the first sensing period, the signal convertor SC receives the sensing signals SS_1 to SS_N from the sensing channels 111_1 to 111_N in the normal sequence. However, as shown in FIG. 3B, in the second sensing period, the second switch element 112_N back to the second switch element 112_1 are sequentially conducted (turned on), so as to sequentially output the sensing signals SS_N to SS_1 to the signal convertor SC. That is to say, in the second sensing period, the signal convertor SC receives the sensing signals SS_1 to SS_N from the sensing channels 111_1 to 111_N in the reverse sequence. In other words, in different sensing periods, the sensing signal outputted from the same sensing channel to the signal convertor SC has different temporal orders in the outputting sequence (normal sequence and reverse sequence). As a result, the sensing signal outputted from the same sensing channel has different hold times in different sensing periods.

When the driver 11 and the system co-work to calculate the gain error and the offset error of the sensing channels 111_1 to 111_N for calibration purpose, the signals received by the sensing channels 111_1 to 111_N are not from the display panel but given voltages provided to the sensing channels 111_1 to 111_N. The given voltages have different levels continuous one after another within a voltage range. For each of the input voltages having different levels, a plurality of sensing periods having different sequences are performed (e.g., normal sequence and reverse sequence are alternately performed once or multiple times). Hence, the sequence of outputting the sensing signals SS_1 to SS_N from the sensing channels 111_1 to 111_N to the signal convertor SC is also alternately changed/switched according to the sensing periods. Accordingly, the system obtains a plurality of digital sensing signals according to a plurality of sensing periods for each of the sensing channels 111_1 to 111_N, so as to calculate an output average signal corresponding to each of the different input voltages, and then to calculate the gain error and offset error to be recorded in the system. As a result, the gain error/offset error in the transfer formula is obtained in a way more accurate compared to the conventional art. Since many different sequences of outputting sensing signals SS_1 to SS_N to the signal convertor SC are performed, the effect of the fixed length of the hold time for each sensing channel is reduced and averaged. In other words, each of the sensing channels 111_1 to 111_N has more than one hold time so as to average the hold time of each of the sensing channels 111_1 to 111_N.

When the driver 11 and the system co-work in real time sensing, the signals received by the sensing channels 111_1 to 111_N are from the display panel 10 and are the sensing signals SS_1 to SS_N. In addition, the driver 11 performs a plurality of sensing periods, and the sequence of outputting the sensing signals SS_1 to SS_N from the sensing channels 111_1 to 111_N to the signal convertor SC is alternately changed/switched according to the sensing periods. The system obtains a plurality of digital sensing signals in a plurality of sensing periods of each of the sensing channels 111_1 to 111_N, so as to calculate a digital average value. As a result, the digital average values corresponding to the sensing channels 111_1 to 111_N are substantially equal to each other. The system further substitute the digital average value for the value of Code in the transfer formula Code'=(Code-offset)/gain, so as to obtain the value of Code', and then calculate the compensating value of the display data of a region of the display panel according to the value of Code'. Wherein, in the transfer formula, "offset" is the offset error of the signal convertor SC, "gain" is the gain error of the signal convertor SC, Code is real time sensing value, and Code' is the actual sensing value calculated by the transfer formula.

In other words, the signal convertor SC converts the sensing signals SS_1 to SS_N of analog format into the sensing signals of digital format and outputs the sensing signals of digital format. An average signal (the digital average value) of the sensing signals outputted from the signal convertor SC during the different sensing periods is calculated for each of the sensing channels 111_1 to 111_N.

Figures 4A, 4B, 4C:
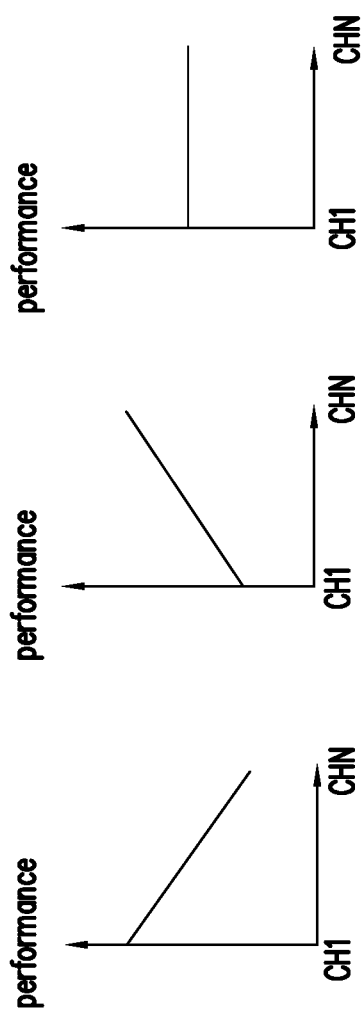
FIG. 4A is a diagram illustrating a relationship between performance and sensing channels in normal sequence.
FIG. 4B is a diagram illustrating a relationship between performance and sensing channels in reverse sequence.
FIG. 4C is a diagram illustrating a relationship between performance and sensing channels after the normal sequence and reverse sequence are alternately performed.

Accordingly, the calculated compensating value is close to the real compensating value of the display data of that region of the display panel 10, so as to reduce or even eliminate the poor uniformity of the display panel 10, as shown in FIGS. 4A, 4B, and 4C. FIG. 4A is a diagram illustrating a relationship between performance and sensing channels in normal sequence. FIG. 4B is a diagram illustrating a relationship between performance and sensing channels in reverse sequence. FIG. 4C is a diagram illustrating a relationship between performance and sensing channels after the normal sequence and reverse sequence are alternately performed.

However, the invention is not limited thereto. In another embodiment, the system may obtain a plurality of digital sensing signals in a plurality of sensing periods of each of the sensing channels, and then substitute for Code in the transfer formula to obtain a plurality of Code' values in order to obtain a plurality of compensating values accordingly. Finally, the plurality of compensating values are averaged to obtain an average compensating value.

In the present embodiment, the normal sequence (outputting the sensing signals SS_1 to SS_N sequentially) and reverse sequence (outputting the signals SS_N to SS_1 sequentially) are alternately performed as an example. There may be more than two different sequences performed, and the invention is not limited thereto. As long as the same sensing channel has a chance to correspond to both smaller hold time and longer hold time, which is equivalent to a situation that the average hold times of the sensing channels 111_1 to 111_N are substantially equal to each other. One example is shown in Table 1, there are 10 sensing channels in total, the sequences of outputting the sensing signals SS_1 to S S_10 from the sensing channels 111_1 to 111_10 to the signal convertor SC are the first sequence and the second sequence which are alternately performed.

TABLE 1

| Channel | 111_1 | 111_2 | 111_3 | 111_4 | 111_5 | 111_6 | 111_7 | 111_8 | 111_9 | 111_10 |
|---|---|---|---|---|---|---|---|---|---|---|
| First Sequence | 1 | 10 | 2 | 9 | 3 | 8 | 4 | 7 | 5 | 6 |
| Second Sequence | 10 | 1 | 9 | 2 | 8 | 3 | 7 | 4 | 6 | 5 |

Figure 5:
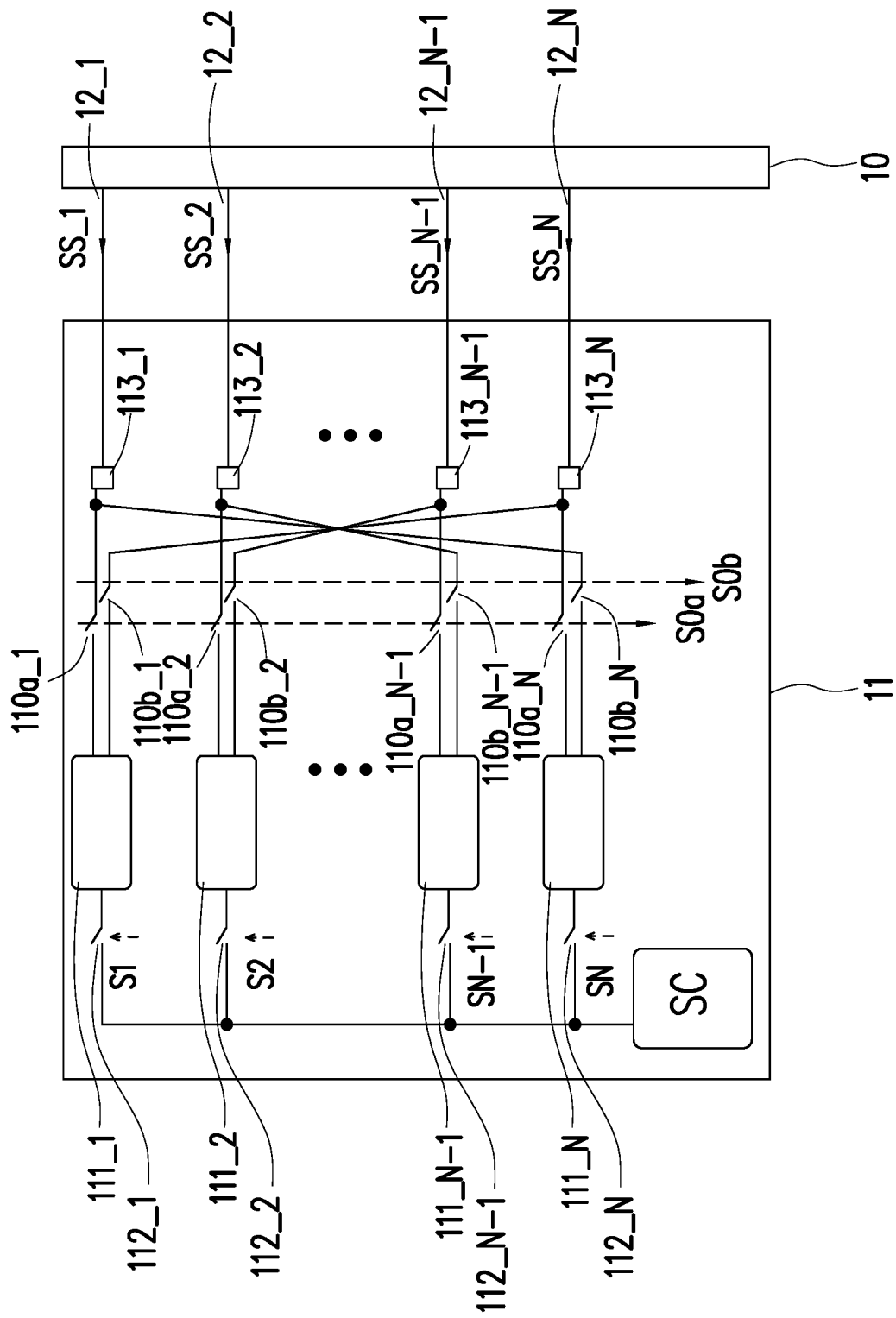
FIG. 5 is a schematic view illustrating circuit in a driver according to the fourth embodiment of the invention.
Figure 6A:
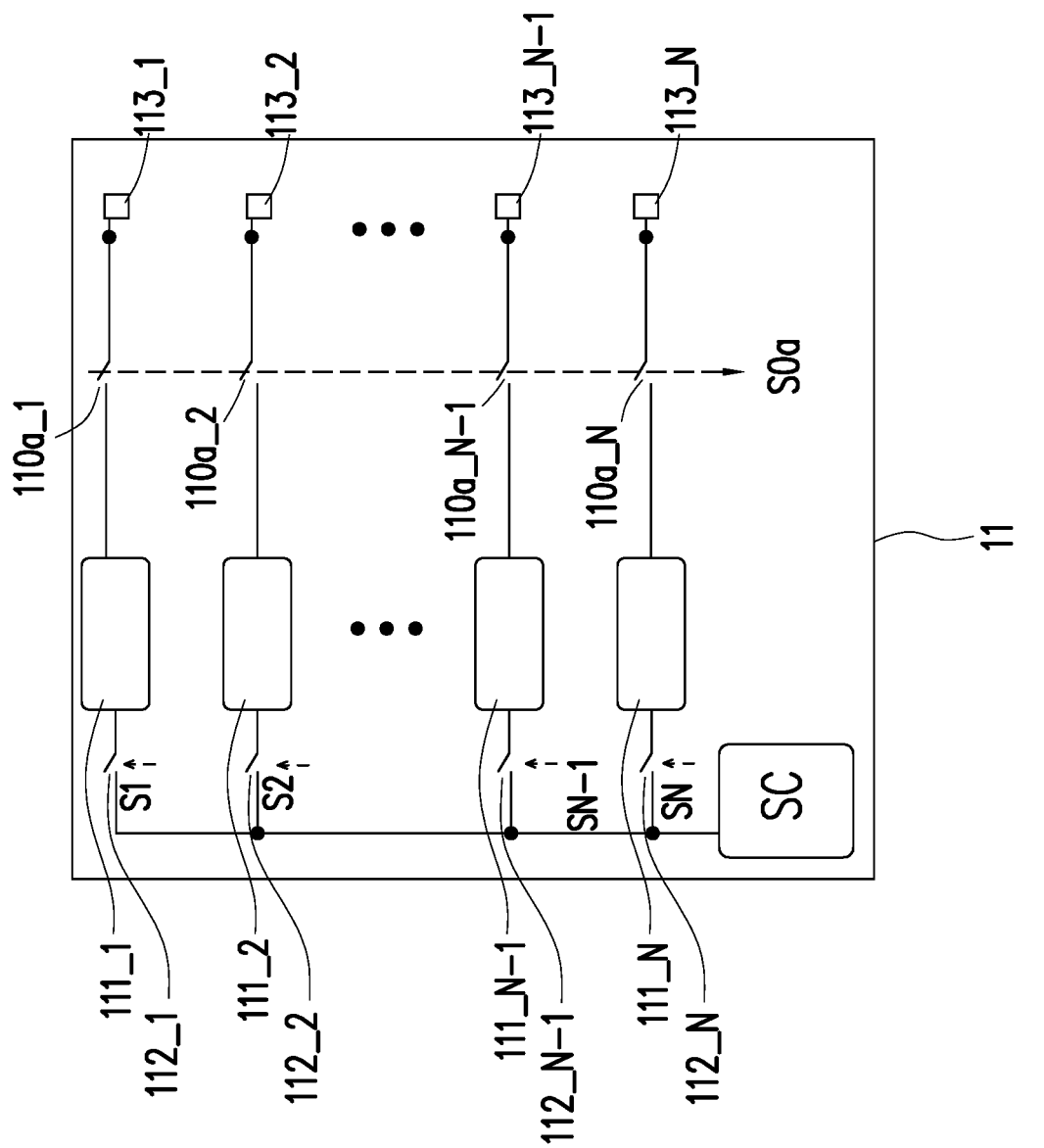
FIG. 6A and FIG. 6B are simplified schematic views illustrating circuit in the driver in different arrangements according to the fourth embodiment of the invention.
Figure 6B:
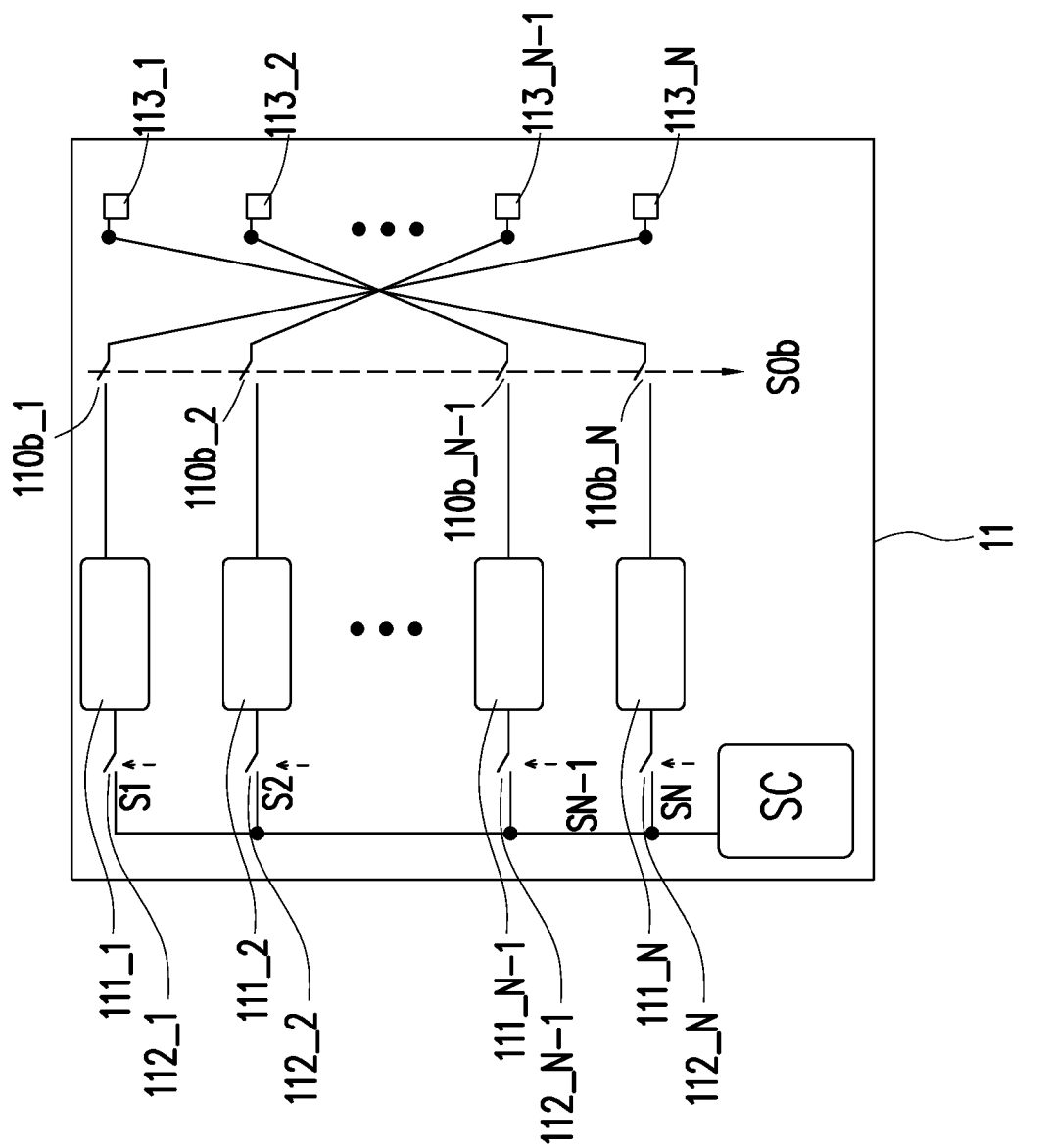

FIG. 5 is a schematic view illustrating circuit in a driver according to the fourth embodiment of the invention. FIG. 6A and FIG. 6B are simplified schematic views illustrating circuit in the driver in different arrangements according to the fourth embodiment of the invention.

In the fourth embodiment, the sensing channels 111_1 to 111_N are coupled to the sensing lines 12_1 to 12_N with different arrangements during different sensing periods. That is to say, the sensing channels 111_1 to 111_N are coupled to the sensing lines 12_1 to 12_N with a first arrangement during a first sensing period, and the sensing channels 111_1 to 111_N are coupled to the sensing lines 12_1 to 12_N with a second arrangement during a second sensing period. The first arrangement and the second arrangement are complementary.

In the present embodiment, the first arrangement is selected from one of a normal arrangement and a reverse arrangement, and the second arrangement is selected from another one of the normal arrangement and the reverse arrangement.

In addition, a plurality of first switch elements 110a_1 to 110a_N are controlled by a first control signal S0a. The first switch elements 110a_1 to 110a N are conducted by the first control signal S0a at the same time during the first sensing period when the sensing channels 111_1 to 111_N receives the sensing signals SS_1 to SS_N from the display panel 10 as shown in FIG. 6A. A plurality of second switch elements 110b_1 to 110b_N are controlled by a second control signal S0b. The second switch elements 110b_1 to 110b N are conducted by the second control signal S0b at the same time during the second sensing period when the sensing channels 111_1 to 111_N receives the sensing signals SS_1 to SS_N from the display panel 10, as shown in FIG. 6B.

Further, a plurality of third switch elements 112_1 to 112_N are coupled between the sensing channels 111_1 to 111_N and the signal convertor SC. The third switch elements 112_1 to 112_N are controlled by a plurality of third control signals S1 to SN. The third switch elements 112_1 to 112_N are conducted according to a sequence of the third control signals S1 to SN when the sensing channels 111_1 to 111_N outputs the sensing signals SS_1 to SS_N to the signal convertor SC. The signal convertor SC converts the sensing signals SS_1 to SS_N of analog format into the sensing signals SS_1 to SS_N of digital format. Additionally, the signal convertor SC outputs the sensing signals SS_1 to SS_N of digital format. An average signal of the sensing signals outputted from the signal convertor SC during the different sensing periods is calculated for each of the sensing channels 111_1 to 111_N.

Furthermore, the sensing channels 111_1 to 111_N are coupled to the sensing lines 12_1 to 12_N with a first arrangement during a first set of sensing periods and with a second arrangement complementary to the first arrangement during a second set of sensing periods as shown in FIG. 6A and FIG. 6B. Each of the first set of sensing periods and the second set of sensing periods includes at least a first sensing period and a second sensing period. The signal convertor SC receives the sensing signals SS_1 to SS_N from the sensing channels 111_1 to 111_N in a first sequence during the first sensing period. The signal convertor SC receives the sensing signals SS_1 to SS_N from the sensing channels 111_1 to 111_N in a second sequence during the second sensing period. The first sequence and the second sequence are complementary. The details about the same sensing line corresponding to different sensing channels at different time to perform compensating will be further described as follows.

In the fourth embodiment, because of process gradient, the capacitance value of the capacitor array in each of the sensing channels 111_1 to 111_N is different from each other. In the driver 11, the circuit between the input pads 113_1 to 113_N and the sensing channels 111_1 to 111_N may be designed so that each of the sensing lines 12_1 to 12_N may be coupled to different sensing channels 111_1 to 111_N at different times (different sensing periods).

The concept of time sharing and averaging is adopted, so the system can obtain a plurality of digital sensing signals through different sensing channels so as to calculate an average value. As shown in FIG. 5, the sensing line 12_1 is coupled to not only the sensing channel 111_1 but also the sensing channel 111_N. In the first sensing period as shown in FIG. 6A, in a normal arrangement, the sensing signal SS_1 sensed by the sensing line 12_1 is stored in the sensing channel 111_1 which has a relatively larger capacitance value. In the second sensing period as shown in FIG. 6B, in a reverse arrangement, the sensing signal SS_1 sensed by the sensing line 12_1 is stored in the sensing channel 111_N which has a relatively smaller capacitance value.

When the driver 11 and the system co-work to calculate the gain error and the offset error of the sensing channels 111_1 to 111_N for calibration purpose, the signals received by the sensing channels 111_1 to 111_N are not from the display panel but given voltages provided to the sensing channels 111_1 to 111_N. The given voltages have different levels continuous one after another within a voltage range. For each of the input voltages having different levels, a plurality of sensing periods are performed. In these sensing periods, although the sensing signals SS_1 to SS_N are still sequentially outputted from the sensing channel 111_1 to the sensing channel 111_N to the signal convertor SC, the corresponding arrangement between the sensing lines 12_1 to 12_N and the sensing channels 111_1 to 111_N is alternately changed/switched according to different sensing periods. Accordingly, the system obtains a plurality of digital sensing signals according to a plurality of sensing periods for each of the sensing channels 111_1 to 111_N, so as to calculate an output average signal corresponding to each of the different input voltages. Next, the system calculates the gain error and offset error to be recorded in the system. As a result, the gain error/offset error in the transfer formula is obtained in a way more accurate compared to the conventional art. Since the corresponding arrangement between the sensing lines 12_1 to 12_N and the sensing channels 111_1 to 111_N is changed/switched, the effect of the fixed length of the hold time for each sensing channel is reduced and averaged. In other words, each of the sensing channels 111_1 to 111_N has more than one hold time so as to average the hold time of each of the sensing channels 111_1 to 111_N.

When the driver 11 and the system co-work in real time sensing, the signals received by the sensing channels 111_1 to 111_N are from the display panel 10 and are the sensing signals SS_1 to SS_N, the driver 11 performs a plurality of sensing periods. The corresponding arrangement between the sensing lines 12_1 to 12_N and the sensing channels 111_1 to 111_N is alternately changed/switched according to the sensing periods. The system in the present embodiment is the same as the system in the third embodiment. In the present embodiment, the system obtains a plurality of digital sensing signals in a plurality of sensing periods of each of the sensing channels 111_1 to 111_N, so as to calculate a digital average value. The system further substitute the digital average value for the value of Code in the transfer formula Code'=(Code-offset)/gain, so as to obtain the value of Code'. Then, the system calculates the compensating value of the display data of a region of the display panel according to the value of Code'. Wherein, in the transfer formula, "offset" is the offset error of the signal convertor SC, "gain" is the gain error of the signal convertor SC, Code is real time sensing value, and Code' is the actual sensing value calculated by the transfer formula. Accordingly, the calculated compensating value is close to the real compensating value of the display data of that region of the display panel 10, so as to reduce or even eliminate the poor uniformity of the display panel 10. In addition, similar to the third embodiment, the system may not average a plurality of digital sensing signals obtained, and may average a plurality of compensating values in order to obtain an average compensating value.

As shown in Table 2, Type 1 is the compensating method of the sensing channels 111_1 to 111_N described in the third embodiment. Type 2 is the compensating method of the sensing channels 111_1 to 111_N described in the fourth embodiment. The terms "normal" and "reverse" mean the normal sequence/arrangement and reverse sequence/arrangement, respectively, and are described in the above-mentioned embodiments. For each sensing channel, "1 Packet" means that the driver 11 sends two digital sensing signals, which are obtained from one sensing channel in two sensing periods (normal sequence/arrangement and reverse sequence/arrangement), to the system. In another way, the driver 11 may also average the two digital sensing signals first and send the average value to the system.

TABLE 2

| Compensation | Type | Time sequence --> | | | | | | | |
|---|---|---|---|---|---|---|---|---|---|
| Method I | Type I | Normal | Reverse | Normal | Reverse | Normal | Reverse | Normal | Reverse |
|  |  | 1 Packet |  | 1 Packet |  | 1 Packet |  | 1 Packet |  |
| Method II | Type II | Normal | Reverse | Normal | Reverse | Normal | Reverse | Normal | Reverse |
|  |  | 1 Packet |  | 1 Packet |  | 1 Packet |  | 1 Packet |  |
| Method III | Type I | Normal | Reverse | Normal | Reverse | Normal | Reverse | Normal | Reverse |
|  | Type II | Normal |  | Reverse |  | Normal |  | Reverse |  |
|  |  |  | 1 Packet |  |  |  | 1 Packet |  |  |

There is also another embodiment described in Table 2, this embodiment (method III) is a combination of the third embodiment (Type 1) and the fourth embodiment (Type 2) and uses four sensing periods as a cycle. When the arrangement between the sensing lines 12_1 to 12_N and the sensing channels 111_1 to 111_N is a normal arrangement, two sensing periods are performed, and the sensing signals SS_1 to SS_N are outputted to the signal convertor SC in normal sequence and reverse sequence. Next, when the arrangement between the sensing lines 12_1 to 12_N and the sensing channels 111_1 to 111_N is a reverse arrangement, two sensing periods are performed, and the sensing signals SS_1 to SS_N are outputted to the signal convertor SC in normal sequence and reverse sequence. The driver 11 sends four digital sensing signals (or an average value of the four digital sensing signals) obtained in four sensing periods for each sensing channel to the system, so that the system calculates offset error/gain error or the compensating value of display data in real-time sensing.

It should be noted that, in the plurality of sensing periods of the above-mentioned embodiments, there are two types of sequences of outputting sensing signals to the signal convertor SC and there are two types of arrangements between the sensing lines 12_1 to 12_N and the sensing channels 111_1 to 111_N. The two types of sequences are alternately changed/switched, and the two types of arrangements are also alternately changed/switched. However, when the number of sensing periods increases to have many cycles along with the time sequence shown in Table 2, the embodiments of the invention are not limited to continuously and alternately changed/switched between two sequences and two arrangements. Take Type 1 (the third embodiment) as an example, the normal sequence is used in the first sensing period of the first cycle, and the reverse sequence is used in the second sensing period of the first cycle. Next, the reverse sequence is used in the first sensing period of the second cycle, and the normal sequence is used in the second sensing period of the second cycle. The reason is that the system only need to receive the predetermined number of the digital sensing signals, for each sensing channel, to calculate the average value. In addition, the system does not need to obtain information about the sequence of the sensing signals received in the driver 11.

In other words, the average hold times of the sensing channels 111_1 to 111_N are substantially equal to each other. Therefore, the compensating value is accurately calculated so as to reduce or even eliminate the poor uniformity of the display panel 10.

Figure 7A:
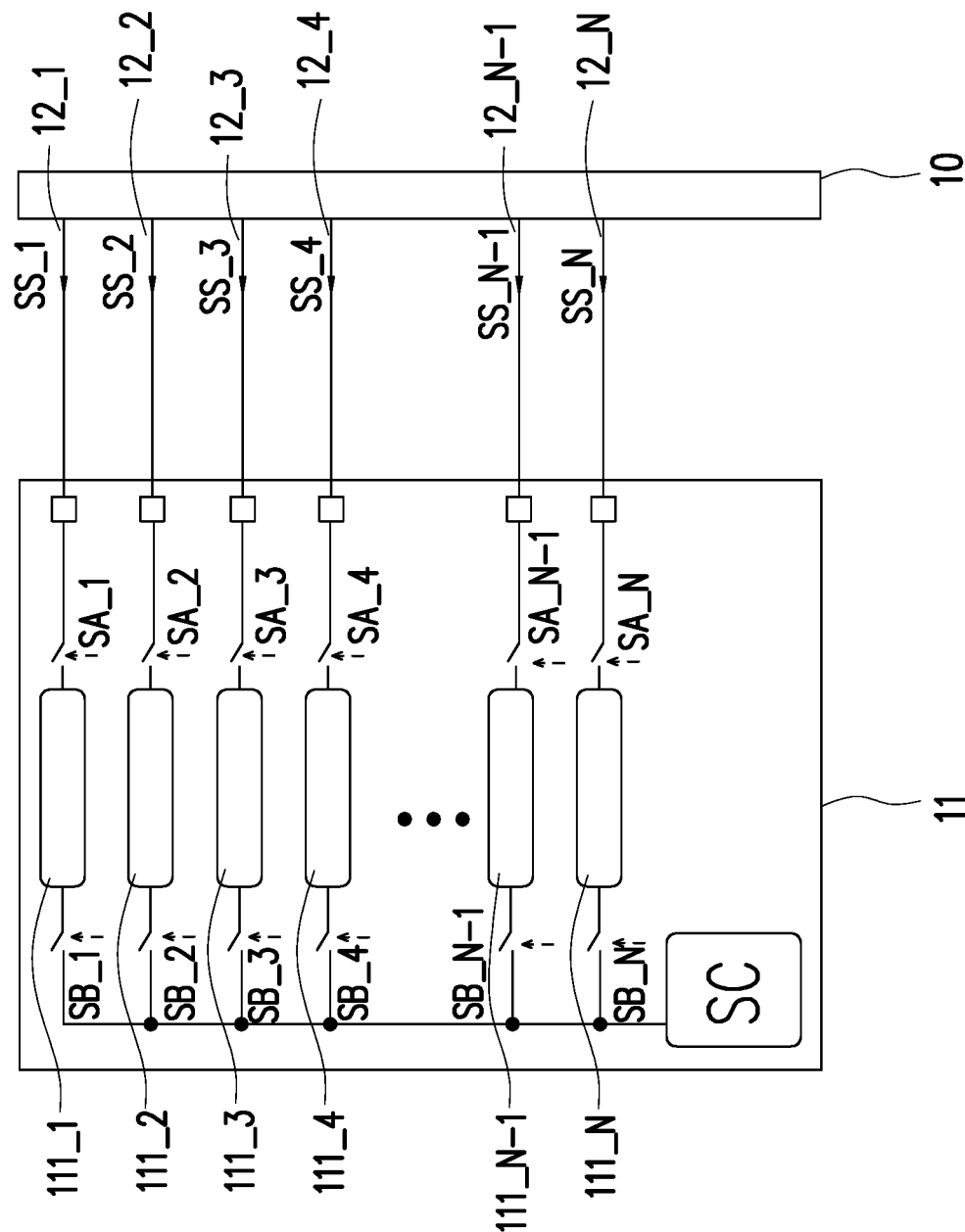
FIG. 7A is a schematic view illustrating circuit in a driver according to the fifth embodiment of the invention.
Figure 7B:
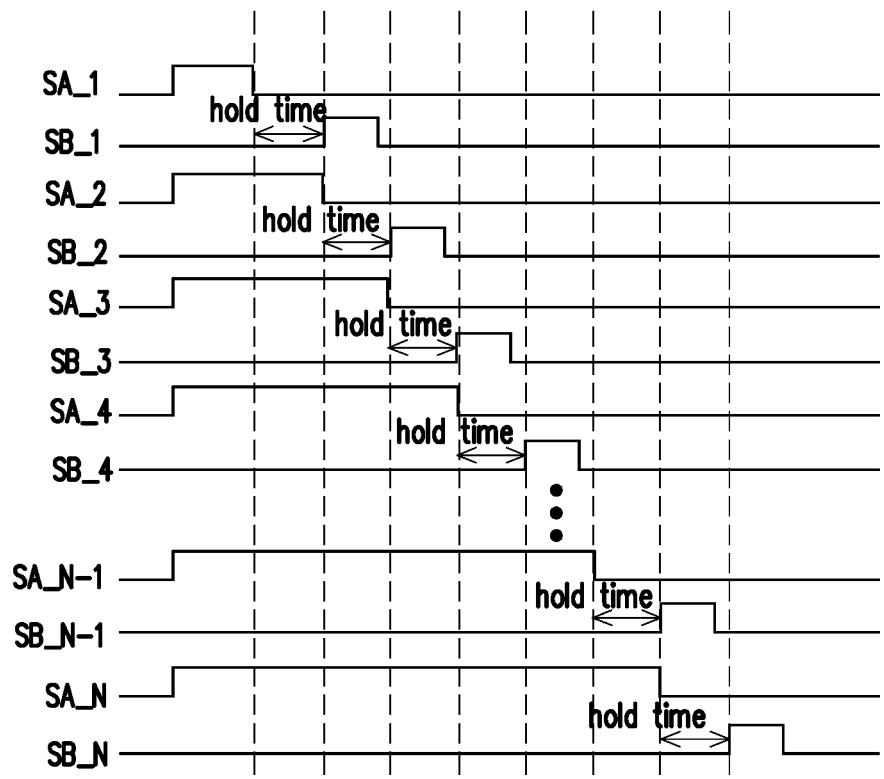
FIG. 7B is a graph illustrating hold times of sensing channels of the fifth embodiment in FIG. 7A.

FIG. 7A is a schematic view illustrating circuit in a driver according to the fifth embodiment of the invention. FIG. 7B is a graph illustrating hold times of sensing channels of the fifth embodiment in FIG. 7A.

In the fifth embodiment shown in FIG. 7A, the sensing channels 111_1 to 111_N are coupled to the sensing lines 12_1 to 12_N in the normal arrangement. The signal convertor SC receives the sensing signals SS_1 to SS_N from the sensing channels 111_1 to 111_N in the normal sequence. Each of the sensing channels 111_1 to 111_N has a hold time for the respective sensing signal in the sensing signals SS_1 to SS_N. The hold times of the sensing channels 111_1 to 111_N substantially have the same time length.

As further shown in FIG. 7B, for each of the sensing channels 111_1 to 111_N, the corresponding one in the first control signals SA_1 to SAN includes an active pulse ending at a first edge and the corresponding one in the second control signals SB_1 to SB_N includes an active pulse starting at a second edge. The hold time of each of the sensing channels 111_1 to 111_N for the respective sensing signal starts at the first edge of the corresponding one in the first control signals SA_1 to SA_N and ends at the second edge of the corresponding one in the second control signals SB_1 to SB_N. For example, the hold time of the sensing channel 111_1 for the respective sensing signal SS_1 starts at the first edge of the first control signal SA_1 and ends at the second edge of the second control signal SB_1. The time length between the first edge of the first control signal SA_1 and the second edge of the second control signal SB_1 is the hold time of the sensing channel 111_1.

In other words, since the poor uniformity of the display panel is caused by different lengths of the hold times of the sensing channels 111_1 to 111_N, one way to improve the uniformity of the display panel is keeping the hold times of the sensing channels consistent with each other. As shown in FIG. 7A, the driver 11 may include a control circuit (not shown) controlling each of the first switch elements SA_1 to SA_N to be turned on (conducted) for a period of time before the second switch element of the same sensing channel is turned on (conducted), so that the hold time of each of the sensing channels 111_1 to 111_N is consistent with each other.

Summarily, in the invention, by the randomly outputting the sensing signals to the signal convertor, the compensating values having greater and smaller values due to gain error and offset error are randomly used to the pixels on the display panel, so as to improve the uniformity of the display panel. In addition, each of the hold times of the sensing channels is averaged and the hold times of the sensing signals are consistent with each other so that the performance of each of the sensing channels is similar to each other. The compensating value is accurately calculated so as to reduce or even eliminate the poor uniformity of the display panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driver of a display panel, the driver comprising:
   a plurality of sensing channels, configured to receive a plurality of sensing signals from the display panel via a plurality of sensing lines and output the sensing signals, wherein the sensing channels are coupled to the sensing lines in an arrangement selected from one of a random arrangement and a normal arrangement, wherein the random arrangement indicates that the sensing channels are randomly coupled to the sensing lines, and the normal arrangement indicates that the sensing channels are sequentially coupled to the sensing lines; and
   a signal convertor, coupled to the sensing channels and configured to receive the sensing signals from the sensing channels in a sequence selected from one of a random sequence and a normal sequence, wherein the random sequence indicates that the signal convertor randomly receives the sensing signals from the sensing channels, and the normal sequence indicates that the signal convertor sequentially receives the sensing signals from the sensing channels,
   wherein the sensing channels are coupled to the sensing lines in the random arrangement to randomly output the sensing signals to the signal convertor, and the signal convertor receives the sensing signals from the sensing channels in the normal sequence.

2. The driver according to claim 1, further comprising:
   a plurality of input pads, corresponding to the sensing lines; and
   a plurality of first switch elements, coupled between the input pads and the sensing channels, wherein the first switch elements are coupled to the sensing channels according to the random arrangement.

3. The driver according to claim 2, wherein the first switch elements are controlled by a first control signal, and the first switch elements are conducted by the first control signal at the same time when the sensing channels receive the sensing signals from the display panel.

4. The driver according to claim 2, further comprising:
   a plurality of second switch elements, coupled between the sensing channels and the signal convertor.

5. The driver according to claim 4, wherein the second switch elements are controlled by a plurality of second control signals, and the second switch elements are conducted according to the normal sequence by the second control signals when the sensing channels output the sensing signals to the signal convertor.

6. A driver of a display panel, the driver comprising:
a plurality of sensing channels, configured to receive a plurality of sensing signals from the display panel via a plurality of sensing lines and output the sensing signals, wherein the sensing channels are coupled to the sensing lines in an arrangement selected from one of a random arrangement and a normal arrangement, wherein the random arrangement indicates that the sensing channels are randomly coupled to the sensing lines, and the normal arrangement indicates that the sensing channels are sequentially coupled to the sensing lines; and
a signal convertor, coupled to the sensing channels and configured to receive the sensing signals from the sensing channels in a sequence selected from one of a random sequence and a normal sequence, wherein the random sequence indicates that the signal convertor randomly receives the sensing signals from the sensing channels, and the normal sequence indicates that the signal convertor sequentially receives the sensing signals from the sensing channels,
wherein the sensing channels are coupled to the sensing lines in the normal arrangement, and the signal convertor receives the sensing signals from the sensing channels in the random sequence to randomly receive the sensing signals from the sensing channels.

7. The driver according to claim 6, further comprising:
a plurality of input pads, corresponding to the sensing lines; and
a plurality of first switch elements, coupled between the input pads and the sensing channels, wherein the first switch elements are coupled to the sensing channels according to the normal arrangement.

8. The driver according to claim 7, wherein the first switch elements are controlled by a first control signal, and the first switch elements are conducted by the first control signal at the same time when the sensing channels receive the sensing signals from the display panel.

9. The driver according to claim 7, further comprising:
a plurality of second switch elements, coupled between the sensing channels and the signal convertor.

10. The driver according to claim 9, wherein the second switch elements are controlled by a plurality of second control signals, and the second switch elements are conducted according to the random sequence by the second control signals when the sensing channels output the sensing signals to the signal convertor.

11. A driver of a display panel, the driver comprising:
a plurality of sensing channels, configured to receive a plurality of sensing signals from the display panel via a plurality of sensing lines and output the sensing signals, wherein the sensing channels are coupled to the sensing lines in an arrangement selected from one of a random arrangement and a normal arrangement, wherein the random arrangement indicates that the sensing channels are randomly coupled to the sensing lines, and the normal arrangement indicates that the sensing channels are sequentially coupled to the sensing lines; and
a signal convertor, coupled to the sensing channels and configured to receive the sensing signals from the sensing channels in a sequence selected from one of a random sequence and a normal sequence, wherein the random sequence indicates that the signal convertor randomly receives the sensing signals from the sensing channels, and the normal sequence indicates that the signal convertor sequentially receives the sensing signals from the sensing channels,
wherein the sensing channels are coupled to the sensing lines in the normal arrangement, and the signal convertor receives the sensing signals from the sensing channels in the normal sequence,
wherein each of the sensing channels has a hold time for the respective sensing signal, and the hold times of the sensing channels substantially have the same time length, and the hold time is the time that the sensing signal is held in the sensing channel.

12. The driver according to claim 11, further comprising:
a plurality of input pads, corresponding to the sensing lines;
a plurality of first switch elements, coupled between the input pads and the sensing channels according to the normal arrangement; and
a plurality of second switch elements, coupled between the sensing channels and the signal convertor.

13. The driver according to claim 12, wherein the first switch elements are conducted by a plurality of first control signals when the sensing channels receive the sensing signals from the display panel.

14. The driver according to claim 13, wherein the second switch elements are controlled by a plurality of second control signals, and the second switch elements are conducted according to the normal sequence by the second control signals when the sensing channels output the sensing signals to the signal convertor.

15. The driver according to claim 14, wherein for each of the sensing channel, the first control signal comprises an active pulse ending at a first edge and the second control signal comprises an active pulse starting at a second edge, and the hold time of the sensing channel for the sensing signal starts at the first edge of the first control signal and ends at the second edge of the second control signal.

16. A driver of a display panel, the driver comprising:
a plurality of sensing channels, configured to receive a plurality of sensing signals from the display panel via a plurality of sensing lines and output the sensing signals; and
a signal convertor, coupled to the sensing channels and configured to receive the sensing signals from the sensing channels,
wherein each of the sensing channels has a hold time for the respective sensing signal, and the hold times of the sensing channels substantially have the same time length, and the hold time is the time that the sensing signal is held in the sensing channel.

17. The driver according to claim 16, further comprising:
a plurality of input pads, corresponding to the sensing lines;
a plurality of first switch elements, coupled between the input pads and the sensing channels according to a normal arrangement, wherein the normal arrangement indicates that the sensing channels are sequentially coupled to the sensing lines; and
a plurality of second switch elements, coupled between the sensing channels and the signal convertor.

18. The driver according to claim 17, wherein the first switch elements are conducted by a plurality of first control signals when the sensing channels receive the sensing signals from the display panel.

19. The driver according to claim 18, wherein the second switch elements are controlled by a plurality of second control signals, and the second switch elements are conducted according to a normal sequence by the second control signals when the sensing channels output the sensing signals to the signal convertor, wherein the normal sequence indicates that the signal convertor sequentially receives the sensing signals from the sensing channels.

20. The driver according to claim 19, wherein for each of the sensing channel, the first control signal comprises an active pulse ending at a first edge and the second control signal comprises an active pulse starting at a second edge, and the hold time of the sensing channel for the sensing signal starts at the first edge of the first control signal and ends at the second edge of the second control signal.

* * * * *